July 2, 1929.  D. RIZZO  1,719,083
CASTER
Filed April 7, 1928
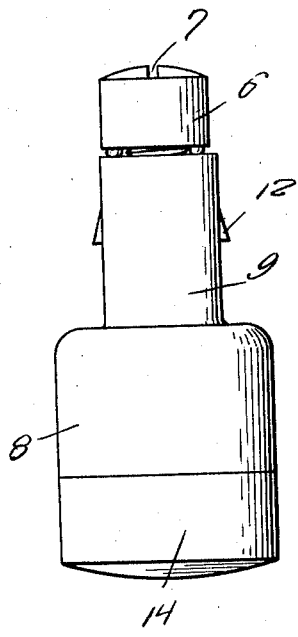
Fig-1-
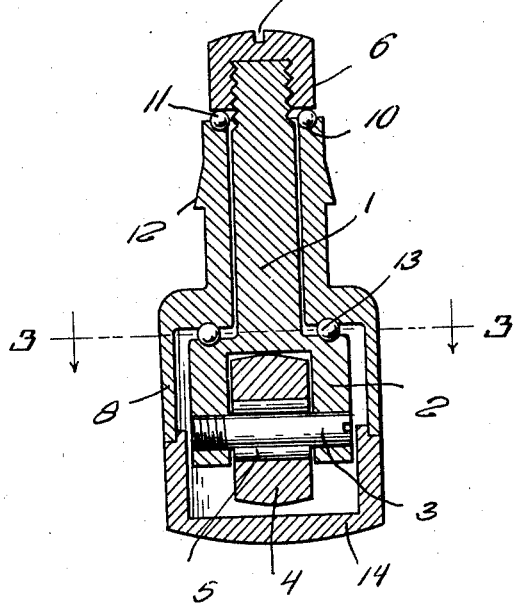
Fig-2-
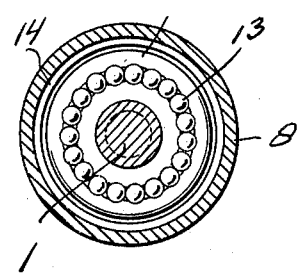
Fig-3-
Inventor
Domenico Rizzo,
By Clarence A. O'Brien
Attorney Patented July 2, 1929.

1,719,083

UNITED STATES PATENT OFFICE.

DOMENICO RIZZO, OF ALBION, NEW YORK.

CASTER.

Application filed April 7, 1928. Serial No. 268,207.

The present invention relates to improvements in casters, and has for its principal object to provide a structure which includes a vertical spindle that is formed at its lower end with a roller or wheel supporting fork, a housing being provided for the spindle and the fork. The upper end of the spindle is threaded to receive a cap while a closure is removably associated with the lower open end of the housing to cover the roller when the caster is not in use, thereby protecting the same.

A further object is to provide a caster of the above mentioned character which is simple in construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application and in which like numerals designate like parts throughout the several views:

Figure 1 is a side elevation of the caster embodying my invention, showing the closure secured on the open lower end of the housing.

Figure 2 is a vertical sectional view through the device shown in Figure 1, and

Figure 3 is a transverse section taken approximately on the line 3—3 of Figure 2, looking in the direction of the arrows.

In the drawing, wherein for the purpose of illustration is shown the preferred embodiment of my invention, the numeral 1 designates the spindle or post of the caster, the same being formed at its lower end with an enlarged fork 2, the furcations of which are formed with registering openings, one of said openings being threaded. A shaft 3 extends through the unthreaded opening formed in one of the furcations of the yoke or fork 2, the other end of this shaft being threaded for engagement with the threaded opening formed in the other furcation as clearly shown in Figure 2.

A wheel or roller 4 is supported on the intermediate portion of this shaft for disposition in the yoke or fork 2, and suitable roller bearings 5 space the wheels with respect to the shaft as also clearly shown in Figure 2.

The upper end of the spindle or post 1 is threaded for receiving thereon the internally threaded cap 6, the top being formed with a kerf or slot 7 to accommodate a screw driver to facilitate turning of the cap. The purpose of this cap will be presently described.

The invention further comprehends the provision of a housing for the spindle and the wheel supporting fork or yoke on the lower end of said spindle and to this end the lower portion of the housing is in the form of a bell and is designated by the numeral 8 for disposition around the yoke or fork 2 and a tubular portion 9 extends upwardly from the bell portion 8 for disposition around the spindle or post 1 as clearly shown in Figure 2.

The upper end of the tubular portion 9 is formed with an annular groove 10 for receiving the ball bearings 11 and by adjusting the cap 6 on the threaded upper end of the spindle or post, the same can be brought into engagement with the ball bearings 11. This tubular portion 9 has formed on its outer face the diametrically opposed teeth 12 that secure the tubular member in a socket provided therefor in the furniture with which the caster is to be associated. Additional ball bearings 13 are arranged between the top portion of the bell 8 and the top portion of the fork or yoke 2, whereby said housing is capable of rotation freely around the spindle and the yoke. It will also be noticed that the lower edge of the bell shaped portion 8 terminates above the lower ends of the furcations and a cup shaped closure 14 is formed at its upper edge with a flange that extends into the lower open portion of the bell A, whereby said cup shaped closure will be supported by the housing to completely cover the wheel and the lower portion of the fork or yoke 2. As clearly shown in the drawing, the bottom of the cup shaped closure is slightly rounded and this closure provides a protector for the wheel when the caster is not in use.

While I have shown the preferred embodiment of my invention it is to be understood that minor changes in the size, shape and arrangement of parts may be resorted to, without departing from the spirit of the invention and the scope of the appended claim.

Having thus described my invention, what I claim as new is:

In a caster, a bell shaped housing open at its lower end and adapted to receive a wheeled caster, and a cup-shaped closure removably secured on the open lower end of the housing and adapted to receive and contain a caster wheel which may be used when the cup-shaped closure is removed.

In testimony whereof I affix my signature.

DOMENICO RIZZO.